United States Patent [19]

Cogswell et al.

[11] Patent Number: 4,713,283
[45] Date of Patent: Dec. 15, 1987

[54] REINFORCED COMPOSITE STRUCTURES

[75] Inventors: Frederic N. Cogswell, Guisborough; Umakant Measuria, Great Ayton, both of England

[73] Assignee: Imperial Chemical Industries PLC, London, England

[21] Appl. No.: 691,643

[22] Filed: Jan. 15, 1985

[30] Foreign Application Priority Data

Jan. 27, 1984 [GB] United Kingdom ................. 8402192
Mar. 6, 1984 [GB] United Kingdom ................. 8405828

[51] Int. Cl.$^4$ ............................................... B32B 5/16
[52] U.S. Cl. ................................. 428/240; 427/389.9; 427/430.1; 427/434.2; 428/241; 428/244; 428/283; 428/260; 428/292; 428/294; 428/324; 428/408; 428/902; 428/273
[58] Field of Search ............... 428/114, 283, 290, 292, 428/293, 294, 295, 241, 242, 244, 323, 324, 408, 902, 240, 260, 273; 427/389.9, 430.1, 434.2

[56] References Cited

U.S. PATENT DOCUMENTS 3,461,094  8/1969  Wesch ............................... 523/203

FOREIGN PATENT DOCUMENTS 056703   7/1982  European Pat. Off. .
102159   3/1984  European Pat. Off. .
102158   7/1984  European Pat. Off. .
2463159  3/1981  France ............................... 428/283

OTHER PUBLICATIONS

Chemical Abstracts, vol. 71, No. 82303d "Reinforced Pipe and other Articles".
Chemical Abstracts, vol. 76, No. 100701s "Filler-containing, Glass Fiber-Strengthened Plastic Products".

*Primary Examiner*—James J. Bell
*Attorney, Agent, or Firm*—Cushman, Darby & Cushman

[57] ABSTRACT

A reinforced composite structure comprising parallel, aligned continuous filaments extending along the maximum dimension of the structure, said fibres being bonded together with a thermoplastic matrix polymer which intimately contacts substantially the whole of the surface of the filaments characterized in that the reinforcement of the structure comprises at least 30% by volume of filamentary reinforcing material and from 1% up to 30% by volume, preferably from 5 to 15% by volume of particulate filler. The preferred process for producing the product use a mixture of polymer, filler and melt plasticizer for the polymer to effect impregnation of the continuous fibres with the melt plasticizer subsequently being volatilized at a temperature at which the polymer is molten.

9 Claims, No Drawings

REINFORCED COMPOSITE STRUCTURES

This invention relates to thermoplastic polymer compositions containing a mixture of fibrous and particulate reinforcement and, in particular, to compositions and products wherein the reinforcement is present in the form of continuous, aligned fibres.

Recent deveopments in the field of reinforced thermoplastic products have provided products containing continuous reinforcing fibres disposed in the products as aligned, parallel fibres which are substantially completely contacted over their surface area by the polymer so that exceptionally stiff products result. European patent publication No. 56703 describes such products and processes of making the products. In general, such products can only be produced at satisfactory commercial production rates by a fibre impregnation process in which the impregnating polymer is of significantly lower viscosity than polymers conventionally used in normal fabrication processes and applications. Thus the products of European patent publication No. 56703 are preferably made using a polymer having a melt viscosity of less than 30 $Ns/m^2$ at the impregnation temperature, compared with a value of greater than about 100 $Ns/m^2$ for conventional polymers. Polymers of the preferred melt viscosity are normally of substantially lower molecular weight than the conventional polymers. Despite the use of lower molecular weight polymers the reinforced products of European Patent Publication No. 56703 have an exceptionally good balance of properties. Despite these excellent properties improvements are constantly being sought. For example, it is important to maximise the resistance to fibre buckling when the composites are subjected to compressive stresses. The present invention provides composite products which are improved in this respect.

According to the invention there is provided a reinforced composite structure comprising parallel, aligned continuous filaments extending along the maximum dimension of the structure, said fibres being bonded together with a thermoformable matrix polymer which intimately contacts substantially the whole of the surface of the filaments characterised in that the reinforcement of the structure comprises at least 30% by volume of filamentary reinforcing material and from 1% up to 30% by volume, preferably from 5 to 15% by volume of particulate filler.

The term 'particulate' filler is meant to include particles which are plate-like or needle-like in structure as well as particles of a spherical or near spherical shape. In order to be accommodated in a structure comprising at least 30% by volume of parallel aligned filaments which preferably have diameters in the range 4 to 24 microns, it is preferred that the filler particles have at least one dimension in the range 1 to 10 microns.

Typical fillers include talc, mica, wollastinite, metal powders and graphite. Graphite is a particularly useful filler for use in composites in which the reinforcing fibre is carbon fibre. The filler need not necessarily be inorganic in nature and finely divided polymer particles such as polytetrafluoroethylene can be used.

The reinforcing fibres may be glass, carbon, or a high modulus synthetic polymer fibre such as the polyaramid supplied by Du Pont as Kevlar (RTM) fibre.

The products of the invention have improved resistance to fibre buckling when subjected to compressive stresses. Other properties of the composite may be enhanced and fillers can be chosen to enhance specific properties, such as electrical conductivity.

The products of the invention are preferably obtained by use of the continuous processes described in European Patent Publications Nos. 102 158 and 102 159, the disclosures of which are incorporated herein by reference. Both these processes are concerned with polymer melt impregnation of continuous rovings so that the filaments of the roving are substantially completely wetted, wherein the polymer melt comprises molten polymer and a material which acts as a plasticiser under melt conditions. The plasticising material should be thermally stable up to the temperature of the melt and may have sufficient volatility so that it can be volatilised from the melt impregnated product below the decomposition temperature of the polymer employed, or it may be a material which is not substantially volatilised at the temperature at which the melt impregnation is carried out. It is preferred that a process is used in which the plasticising material can be removed because such materials are likely to have some adverse effect on the modulus of the composite produced.

By a "plasticiser" in the context of these publications and the present invention is meant a material which will enable a melt to be obtained from a polymer having a lower melt viscosity than that of the polymer alone measured under the same conditions. Although the combination of polymer and plasticiser will normally exist as one phase this is not essential and more than one phase may exist.

It is an essential feature of these processes using a plasticiser that the polymer in the mixture is present in melt form. The temperature of the melt must be above the glass transition temperature (Tg) of the polymer component. In the case of a crystalline polymer its melting point may be well above its Tg so that the temperature of the melt must be well above the Tg of the polymer employed. It is not necessary in every case that the temperature of the melt mixture is above the melting temperature of the polymer itself because in some cases the plasticiser will lower the melting point of the polymer.

The processes of European Patent Publications Nos. 102 158 and 102 159 offer an advantage over the impregnation processes described in European Patent Publication No. 56703 in that it is possible to achieve thorough impregnation of the filaments using polymers of higher melt viscosity than can be used in the processes of European patent application No. 56703. This advantage arises because the presence of melt plasticiser enables a low overall melt viscosity to be obtained for the impregnant melt compared with the use of a polymer melt not containing plasticiser. The presence of particulate fillers in a melt causes an increase in the viscosity of the melt and consequently it is preferred to use the processes of European patent publications Nos. 102 158 and 102 159 rather than those described in European patent publication No. 56703 because the overall melt viscosity when using a given polymer can be minimised. Alternatively the molecular weight of the polymer chosen can be maximised when a melt plasticiser is present.

The most important aspect of the use of the processes using melt plasticisers is that they enable the volume concentration of the continuous fibre to be minimised at the impregnation stage. The volume available for accommodating the particulate filler between the continuous filaments is thereby maximised during this stage.

The ability to be able to remove the plasticiser enables filled compositions of high fibre content to be obtained which would be extremely difficult to manufacture using the processes of European Patent Publication No. 56703 in which the melt consists of a polymer melt undiluted by plasticiser.

The melt plasticiser can be used in the range of proportions of 1 part by weight of polymer to 4 parts by weight of plasticiser up to 99 parts by weight of polymer to 1 part by weight of plasticiser. The preferred range is from 1:3 to 19:1.

Accordingly in a preferred process of manufacturing the structure of the invention there is provided a process of producing a reinforced thermoplastic polymer composite structure containing at least 30% by volume of continuous reinforcing filaments comprising introducing a plurality of continuous filaments into a polymer melt characterised in that the melt comprises a mixture of a thermoplastic polymer, a particulate filler and a plasticiser for the polymer in the weight ratio between 1:4 and 99:1 of polymer to plasticiser, preferably in the weight ratio 1:3 to 19:1, cooling the impregnated structure and optionally removing the plasticiser before or after the cooling step, the plasticiser being thermally stable at least up to the temperature of the melt wherein the volumetric concentration of the particulate filler is from 1 to 30%, preferably from 5 to 15% of the composite structure.

The melt plasticiser may be removed before or after the cooling step. The best method of removal will depend on the volatility of the melt plasticiser. Where its volatility characteristics enable it to be removed from the impregnated structure below the decomposition temperature of the polymer it is preferred to remove it before cooling the structure by holding it at a sufficiently elevated temperature for sufficiently long to volatilise substantially all the plasticiser. Best results are achieved when the plasticiser is volatilised at a temperature at which the polymer is, still molten. Where the plasticiser is involatile at temperatures below the decomposition temperature of the polymer it may be removed after cooling the structure by solvent extraction techniques. This is a less preferred method because of the need to ensure that the solvent itself is also removed and the need to consolidate the resulting composite sufficiently to remove voids left by plasticiser removal.

In order to maximise the properties of the composite it is essential to ensure that the individual filaments are substantially completely wetted with polymer. In addition to using polymers of sufficiently low melt viscosity, preferably less than 30 Ns/m$^2$ at the impregnation temperature as described in European Patent Publication No. 56703, or including plasticisers to enable higher molecular weight polymers to be used as described in European patent application Nos. 102 158 and 159, these patents disclose processes in which work is effected on the structure at the impregnation stage to ensure that the melt thoroughly contacts the filaments. This work input is made possible by the practice of drawing tensioned filaments over surfaces against which the melt filaments mixture is biassed. The continuous filaments used are fibrous products having fibres sufficiently long to give a material of sufficient strength, under the processing conditions used, to be hauled through the molten polymer without the frequency of breakage which would render the process unworkable. It is preferred that the process employs fibrous products in which the fibres are substantially aligned, parallel fibres, including products which contained parallel fibres aligned in more than one direction such as woven products.

It has now been found that the high tension used in the processes described in European Patent Publication No. 56703 as being useful in aiding complete impregnation is not necessary when a melt plasticised polymer composition is used as impregnant in a process in which the plasticiser is volatilised from the reinforced impregnated composition at a temperature at which the polymer is molten. Surprisingly the mere action of volatilisation plays a substantial role in the impregnation process and it is not necessary to impart a high tension in the fibrous structure during impregnation. This is particularly useful when woven fabrics are being impregnated because high tensioning in one direction causes serious distortion of the fabric. Thus the use of the process of European Patent Publication No. 102159 is a particularly preferred process for forming the reinforced structures of the present invention.

The preferred processes used in the present invention are adapted from processes described in European Patent Publication Nos. 102 158 and 102 159. In these publications a process is described in which the continuous fibrous product is introduced to the molten composition by pulling the fibrous product over bars or rollers which are situated within a bath of the molten composition. The action of biassing the continuous fibre against the bars or rollers results in fibrous product.

In another process described in European Patent Publication Nos. 102 158 and 102 159 the amount of polymer held in a molten state at any given time is minimised by using a process in which the continuous roving or tow is formed into a band comprising substantially contiguous filaments which are pulled over a spreader surface, preferably a heated spreader surface, to form a nip between the band and the spreader surface and a molten mixture of polymer and plasticiser is provided at the nip. In an alternative process at least part of the heat required to provide a molten mixture is provided by heating the fibre directly. Impregnation of the band formed by the contiguous filaments is effected by tensioning the continuous band so that positive pressure is applied on the polymer melt by the band as it is pulled over the spreader surface. However, when a melt plasticised compositions is employed the tensioning can be reduced to a minimum as indicated above.

The products of the invention are normally obtained in the form of thin, continuous products, such as in the form of small diameter rods or thin sheets. These products can be further processed to form thicker structures suitable for construction purposes in which the designer or engineer makes optimum use of the strength and stiffness of the continuous fibres.

The polymer matrix used in the invention is preferably a tough thermoplastic polymer having a tensile yield stress of at least 70 MN/m$^2$, but may be thermosetting in nature providing that it can form a melt. The preferred polymers are those which are repeatedly thermoformable, but which do not show any significant chemical change as a result of the repeated thermoforming operations. Also suitable for use in the invention are polymers which are not tough thermoplastics having a tensile yield stress of at least 70 MN/m$^2$, but which can be converted to such polymers after the impregnation stage of the process by known means of increasing molecular weight.

The thermoplastic polymers used in the process of the invention are preferably those containing aromatic repeat units in the chain, such as polysulphones, polyethersulphones, polyetherketones, polyetheretherketones, polyarylene oxides, polyarylene sulphides, aromatic polyamides, aromatic polyesters, aromatic polycarbonates and polyetherimides. In general, the thermoplastic aromatic polymers used in the compositions of this invention comprise repeat units of the general formula

where Ar is selected from mono or polycyclic aromatic radicals and X is selected from at least one of O, S, SO$_2$, O.CO, O.CO.O, CO, —NHCO— and

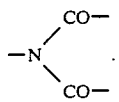

Ar and/or X may vary from unit to unit in the polymer chain.

Particularly useful are the class of polyetherketones which contain the recurring unit (I):

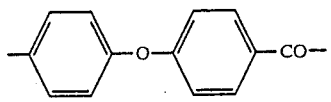

Such polymers are disclosed, inter alia, in British patent specification No. 1 414 421 which describes such polymers containing the unit (I) as the sole repeating unit or in conjunction with the repeating unit (II):

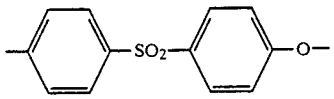

A preferred polyetheretherketone having the repeating unit (III):

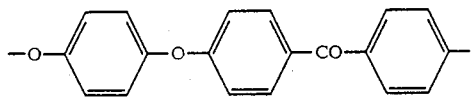

either alone or in conjunction with other repeating units is disclosed in European patent publication No. 1879.

Examples of polyethersulphones and processes for their production are described in British patent specification Nos. 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 296 383, 1 298 821 and 1 303 252, Canadian patent specification No. 847 963, German OLS specification Nos. 1 938 806 and 2 433 400 and Swiss patent specification No. 491 981.

The plasticisers which are suitable for use in the invention are of two types. They may be materials which are thermally stable at the elevated temperatures which are characteristic of the melting points of the thermoplastic polymers used in the invention, which can be volatilised from the composition at temperatures below the decomposition temperature of the thermoplastic polymer but which are sufficiently involatile at the temperature employed in the impregnation process to provide a plasticised polymer melt of lower melt viscosity than the polymer itself. In the case of aromatic polymers suitable plasticisers having these characteristics are found in the classes aromatic ketones, aromatic sulphones and aromatic esters. Typical high boiling materials are diphenyl sulphone, ditolyl sulphone, benzophenone, phenyl benzoate and benzyl benzoate.

Alternatively the plasticisers may be involatile below the decomposition temperature of the polymer used. Such plasticisers can be extracted by a suitable solvent, but plasticisers which do not affect the properties of the composite may be allowed to remain in the composite.

The mixture of plasticiser and polymer may be provided by any conventional technique for providing mixture. For example, mixture may be a dry blend of polymer and plasticiser, a mixture which has been intimately mixed by compounding in a screw extruder, a mixture prepared by coating granules of the polymer with a solution of a plasticiser and volatilising the solvent from the coated granules or in some cases a suitable plasticiser may be used in the course of producing the aromatic polymer. Whereas in the normal course of isolating such polymer the plasticiser would need to be removed the plasticised product constitutes an ideal and cheaper raw material for the present invention than the isolated polymer.

Although the major use of the impregnated products obtained from the processes hereinbefore described is in applications requiring the use of long lengths of the products, that is greater than 100 mm long, the products find particular utility when chopped into pellets or granules in which the reinforcing fibres have a length of at least 3 mm and preferably at least 10 mm. These products may be used in the conventional fabrication process such as injection moulding and show advantages over prior art products in pellet form because the fibre length in the pellet is retained to a much greater extent in articles fabricated from the pellets of the invention than when using the prior art products. This greater retention of fibre length is believed to be a result of the greater protection afforded to the individual reinforcing filaments in the product of the invention by virtue of the good wetting by polymer which arises from use of the processes hereinbefore described.

This aspect of the invention is particularly important because it enables reinforced articles to be formed in versatile operations, such as injection moulding, which employ screw extrusion processes to melt and homogenise the feed material, with a surprisingly high retention of fibre length and consequent enhancement of physical properties. Thus the product of the invention enables moulded articles to be obtained from fabrication processes which employ screw extrusion which articles contain at least 50% and preferably at least 70% by weight of the fibres in the article of a length of at least 3 mm long. This is considerably longer than currently obtainable from the commercially available reinforced products.

The products suitable for injection moulding may be used directly or may be blended with pellets of other thermoplastics products. These other products may be of the same polymer but having different molecular weight or may be of a different polymer providing that the presence of the different polymer does not adversely affect the overall balance of properties of the composition. The other products may be an unfilled polymer or may contain a particulate or fibrous filler. Blends with materials containing the conventionally produced reinforced moulding powders, that is moulding powders with reinforcing fibres up to about 0.25 mm long are particularly suitable because the overall reinforcing fibre content of the blend can be kept high to produce maximum strength even though the shorter reinforcing fibres do not contribute so effectively as the long fibres present from the product of the present invention.

The invention is further illustrated by reference to the following example.

EXAMPLE

The following composites were prepared by the process described in Example 1 of European patent publication No. 102 159 at a linear speed of 0.25 m/minute. All composites were prepared from continuous collimated "Magnamite" AS4 high strength carbon fibre ("Magnamite" is a Hercules Corporation tradename). The resin phase was composed of polyetheretherketone having a melt viscosity at 400° C./1000 sec$^{-1}$ of 100 Ns/m$^2$ in which was dispersed zero, 10, 20 and 30 parts by weight based on the weight of the resin (0, 6, 13 and 21 percent by volume) of a platey graphite "Foliac" graphite 2105 (supplied by Rocol Ltd, Leeds). The graphite was mixed with the resin by powder mixing and that mixture was then powder blended with an equal weight diphenyl sulphone. During the impregnation process at 400° C. the diphenyl sulphone acted as a volatile plasticiser as described in European Patent Publication No. 102 159 and was volatilised by holding the impregnated composition at 400° C. by passing the impregnated fibres under and over bars held at 400° C. The sample containing no filler was found to contain 64% by weight of fibre based on the total weight of the composite. The samples containing filler were found to have fibre contents of 6% by weight based on the total weight of the composite.

The samples containing 6 and 13% by volume of graphite (10 and 20 parts by weight) impregnated readily but the sample containing 21% by volume (30 parts by weight) had a tendency to cause splits in the prepreg and represents a practical limit for this particular platey filler. The prepreg tapes so formed were laminated by compression moulding at 380° C. The flexural modulus of each of the samples was tested according to ASTMD 790-58T. The following results were obtained.

| Sample | Fibre Content (% by wt of composite) | Filler Content (% by wt of resin) | Flexural Modulus (GN/m$^2$) |
| --- | --- | --- | --- |
| A | 64 | 0 | 111 |
| B | 61 | 10 | 119 |
| C | 61 | 20 | 120 |

-continued

| Sample | Fibre Content (% by wt of composite) | Filler Content (% by wt of resin) | Flexural Modulus (GN/m$^2$) |
| --- | --- | --- | --- |
| D | 61 | 30 | 121 |

We claim:

1. A reinforced composite structure comprising parallel, aligned continuous filaments extending along the maximum dimension of the structure, said filaments being present in a thermoplastic matrix polymer which intimately contacts substantially the whole of the surface of the filaments characterised in that the reinforcement of the structure comprises at least 30% by volume of filamentary reinforcing material and from 1% up to 30% by volume of particulate filler and that said intimate contact between matrix polymer and the surface of the filaments is achieved by the use of a molten mixture of thermoplastic polymer and plasticizer for the polymer.

2. A reinforced composite structure according to claim 1 wherein the concentration of particulate filler is between 5 and 15% by volume.

3. A reinforced composite according to either of claims 1 or 2 in which the particulate filler is selected from talc, mica, wollastinite, metal powders and graphite.

4. A reinforced composite according to claim 1 wherein the reinforcing fibre is selected from glass, carbon and high modulus synthetic polymer fibres.

5. A process of producing a reinforced thermoplastic polymer composite structure containing at least 30% by volume of continuous reinforcing filaments impregnated with thermoplastic polymer comprising: introducing a plurality of continuous filaments into a polymer melt to produce an impregnated structure characterised in that the melt comprises a mixture of a thermoplastic polymer, a particulate filler and a plasticiser for the polymer in the weight ratio between 1:4 and 99:1 of polymer to plasticiser, cooling the impregnated structure and optionally removing the plasticiser before or after the cooling step, the plasticiser being thermally stable at least up to the temperature of the melt wherein the volumetric concentration of the particulate filler is from 1 to 30%.

6. A process according to claim 5 wherein the plasticiser is volatilised at a temperature at which the polymer is molten, after the continuous filaments have been introduced into the plasticised polymer melt.

7. A process according to either of claims 5 or 6 in which the weight ratio of polymer to plasticiser is in the range 1:3 to 19:1.

8. A process according to claim 5 in which the thermoplastic polymer is a thermoplastic having a tensile yield stress of at least 70 MN/m$^2$.

9. A process according to claim 5 wherein the thermoplastic polymer has a tensile yield strength of less than 70 MN/m$^2$ prior to the impregnation stage but is treated so as to increase the tensile yield stress to greater than 70 MN/m$^2$ after the impregnation stage.

* * * * *